United States Patent [19]
Lehmann

[11] 3,823,491
[45] July 16, 1974

[54] READING AND SPELLING TEACHING AID

[76] Inventor: Mary L. Lehmann, 4552 McPherson Ave., St. Louis, Mo. 63108

[22] Filed: Oct. 30, 1972

[21] Appl. No.: 301,854

[52] U.S. Cl.................... 35/35 R, 35/7 A, 281/37, 283/46
[51] Int. Cl. .......................................... G09b 17/00
[58] Field of Search........ 35/35 R, 35 F, 35 H, 7 A, 35/9 R; 281/29, 33, 37; 283/46

[56] References Cited
UNITED STATES PATENTS

| | | | |
|---|---|---|---|
| 78,296 | 5/1868 | Leigh | 283/46 |
| 198,507 | 12/1877 | Dawson | 283/46 |
| 1,163,184 | 12/1915 | Thompson | 283/46 |
| 1,270,566 | 6/1918 | Thompson | 283/46 X |
| 1,732,980 | 10/1929 | Mooney | 35/35 J X |
| 2,369,804 | 2/1949 | Shoolfield | 35/35 H |
| 2,523,202 | 9/1950 | Ericson | 281/33 |
| 2,938,282 | 5/1960 | Spielman | 35/35 H |
| 3,156,056 | 11/1964 | Pribil | 35/7 A X |
| 3,460,273 | 8/1969 | Boyd | 35/35 F |
| 3,662,477 | 5/1972 | Weinstein | 35/9 R |

FOREIGN PATENTS OR APPLICATIONS

| | | | |
|---|---|---|---|
| 749,001 | 5/1956 | Great Britain | 35/35 F |
| 322,655 | 12/1929 | Great Britain | 35/35 F |

*Primary Examiner*—Wm. H. Grieb
*Attorney, Agent, or Firm*—Lionel L. Lucchesi

[57] ABSTRACT

A teaching device includes a board having a plurality of phonic representations displayed in columns. The columns generally are tabulations of consonant-vowel-consonant sounds. Forty three sounds including arrangements for 16 vowel sounds are displayed in a variety of spelling configurations. Means are provided for selecting portions of the phonic representations corresponding to a given word. A game method is disclosed which uses the device of this invention to convey information. A player or student selects sounds from those presented to solve a word problem.

8 Claims, 7 Drawing Figures

1. <u>sh</u>
2. b, <u>be</u>
3. k, c, <u>ke</u>, <u>ck</u>
4. <u>qu</u>
5. d, <u>de</u>, <u>ed</u>
6. <u>ph</u>, f, <u>fe</u>, <u>ff</u>, <u>gh</u>
7. <u>gu</u>, g, <u>gue</u>
8. j, <u>ge</u>, <u>dge</u>
9. h
10. l, <u>le</u>, <u>el</u>, <u>ll</u>
11. <u>wh</u>
12. m, <u>me</u>
13. <u>ng</u>
14. <u>kn</u>, n, <u>ne</u>
15. <u>ch</u>, <u>tch</u>
16. p, <u>pe</u>
17. <u>ve</u>
18. r, <u>er</u>, <u>re</u>, <u>wr</u>
19. s, c, <u>ce</u>, <u>se</u>, <u>ss</u>
20. v
21. t, <u>te</u>
22. w, u
23. <u>th</u>, <u>the</u>
24. x
25. y, i
26. z, <u>ze</u>, <u>zz</u>
27. ◡
28. ā<u>te</u>, <u>ei</u>ght
29. s<u>a</u>d, pl<u>ai</u>d
30. s<u>ēe</u>, sill<u>ý</u>, sk<u>í</u>
31. b<u>e</u>d, h<u>éa</u>d, s<u>ai</u>d
32. mī<u>ne</u>, mȳ
33. b<u>i</u>g, g<u>y</u>m, b<u>u</u>sý
34. s<u>ō</u>, būr<u>eáu</u>, s<u>ew</u>
35. g<u>o</u>t, w<u>a</u>tch
36. c<u>ū</u>t<u>e</u>, f<u>ew</u>, crū<u>ise</u>, fl<u>ew</u>
37. s<u>u</u>n, s<u>ŏ</u>n
38. t<u>ó</u>, t<u>óo</u>, y<u>óu</u>
39. b<u>oo</u>k, b<u>u</u>sh
40. h<u>ouse</u>, g<u>own</u>
41. w<u>â</u>ll
42. b<u>oi</u>l, b<u>oy</u>
43. app<u>le</u>, b<u>ir</u>d

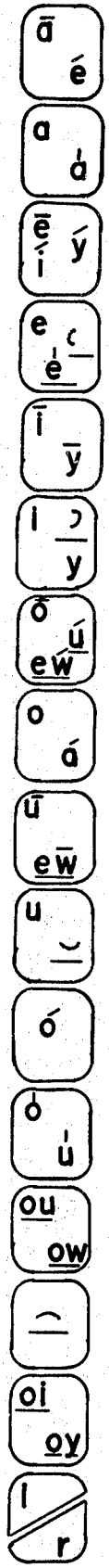

FIG. 1.

PATENTED JUL 16 1974 3,823,491
SHEET 2 OF 4
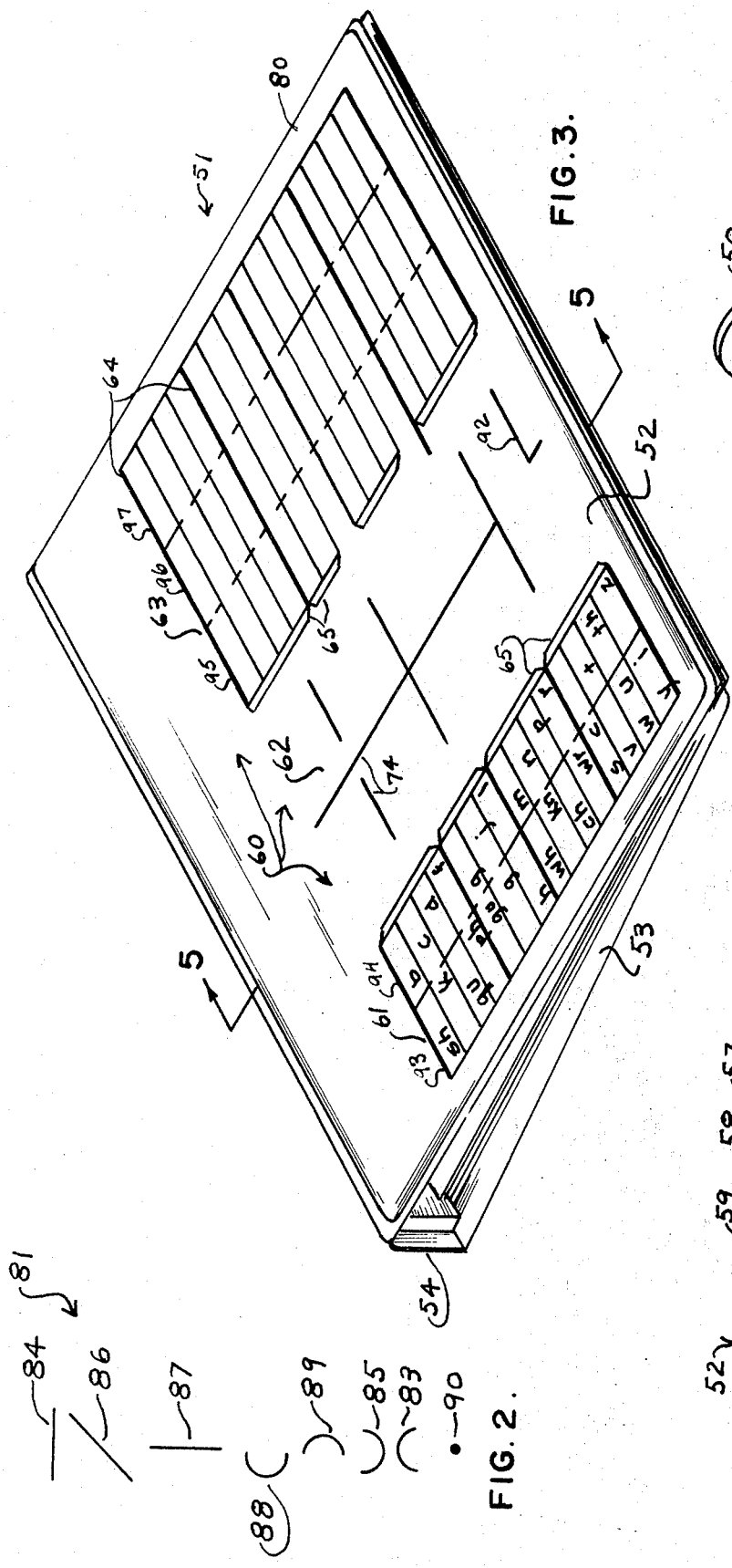
FIG. 3.
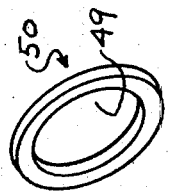
FIG. 7.
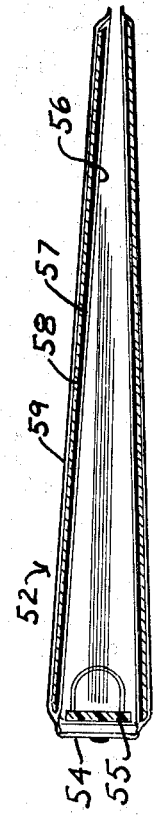
FIG. 5.
FIG. 2.

READING AND SPELLING TEACHING AID

BACKGROUND OF THE INVENTION

This invention relates to a device for teaching spelling and reading. While the device is described in particular detail with reference to the English language, those skilled in the art will recognize that the broader aspects of this invention may be applied to teach any spoken and written language.

The prior art includes a number of systems and devices which attempt to teach reading, spelling or both in a multiplicity of ways. The more pertinent of the prior art includes the U.S. Pat. to Boyd, No. 3,460,273 issued Aug. 12, 1969; Spielman, U.S. Pat. No. 2,938,282 issued May 31, 1960; Schoolfield, U.S. Pat. No. 2,369,804 issued Feb. 20, 1949; Mooney, U.S. Pat. No. 1,732,980 issued Oct. 22, 1929; Thomson, U.S. Pat. No. 1,270,566 issued June 25, 1918; Thompson, U.S. Pat. No. 1,163,184 issued Dec. 7, 1915; Dawson, U.S. Pat. No. 198,507 issued Dec. 25, 1877; and Leigh, U.S. Pat. No. 78,296 issued May 26, 1868. While this body of prior art works well for its intended purposes, it has several inherent disadvantages.

As a class, the prior art devices generally are based on what, for the purpose of this specification, may be called closed channel methods of instructions. For example, the radio, the television, and any published book are closed channel methods of conveying information. Only particular senders get to send a message. The closed channel method always is one way. The heretofore conventional method of teaching a child to read follows a pattern of moving fixed step by fixed step through a number of closed channel readers and workbooks. These readers and workbooks, and the art mentioned above, are not able to carry on a two way conversation. In other words, learning to read heretofore has been a closed channel approach. A child learning to talk by this approach would hear only words carefully chosen for pronouncing at his age, which he would have to recite. Clearly he would never learn to talk. Similarly, because of the closed channel method of teaching, a child often gives up on trying to attain proficiency in reading and writing before he progresses very far.

A spoken language may be considered a code. It is thousands and thousands of individual words. Words are the simplest parts of the code that can be used separately. Words stand for all the real things in our environment that we can think about. That is, words are the simplest parts that can have meaning. Learning how to use those words well to send and receive messages, that is, learning the spoken code, consumes a large portion of our lifetime from the time of infancy. When a person is reading, he is converting into mentally heard, understood sound what he sees written on paper. Restated, he is hearing what he sees and understanding what he hears. The device of this invention is intended to utilize words already verbally known to the student. That is, the student is able to choose the word he wants to see written. Consequently, understanding of the word by the student can be assumed and reading can be treated simply as a matter of hearing or playing back written sounds. The device of this invention enables students to equate the written and the spoken word.

The primary means for accomplishing this end is a device having a plurality of phonic representations arranged in columns on it. The device can be used to divide a word or words according to its syllables. The device covers all the more usual variations of spelling for certain words. The device includes means for enabling a student to choose word elements from those presented and to tell, from the position of the choosing means, both the spelling and the pronounciation of the word. This process forces the student to see the direct correlation between written letters and spoken sounds for a word, enabling him to write the word and later to say the word once he sees it in writing.

One of the objects of this invention is to provide a device for teaching reading that is culturally neutral, permitting the student's own choice of words for translating into writing.

Another object of this invention is to permit immediate communication in writing by a child who does not yet know the written and spoken equivalents.

Another object of this invention is to acquaint a student with the correlation between written and spoken sounds forcing the student to recognize the corresponding sounds for any spelling and the corresponding spellings for any sounds.

Another object of this invention is to provide a means for a teacher rapidly to convey spelling information for any length words without having to write the words, thereby forcing the student to do so by hearing the sound sequence.

Another object of this invention is to provide a system for teaching reading enabling the student to break down any word of his choice, regardless of the length of word.

Still another object of this invention is to provide a low cost open channel teaching aid.

Yet another object of this invention is to provide a device which illustrates the principle spelling choices for consonant sounds and a majority of the vowel sounds in the English language.

Still a further object of this invention is to provide a means by which a student can master syllabification.

Other objects of this invention will be apparent to those skilled in the art in light of the following description and accompanying drawings.

SUMMARY OF THE INVENTION

In accordance with this invention, generally stated, an educational device is provided having a plurality of phonic representations disposed in a columnar array. The array generally corresponds to syllable structure and is arranged in consonant-vowel-consonant columns corresponding to the most common syllable structure in the language. Means are provided for choosing the phonic representation of any word.

The preferred embodiment is a loose leaf notebook which has a conventional ring binder component attached to a closure structure. The closure structure includes at least a first side which is a laminated construction including a strip of magnetic material and a cover overlay. The cover overlay has the phonic array disposed on it. A magnetized annulus is provided which adheres to the closure enabling a student to choose and display the sounds of a word.

BRIEF DESCRIPTION OF THE DRAWINGS

In the drawings,

FIG. 1 is a listing of phonic representations used in conjunction with the device of this invention;

FIG. 2 is a listing of diacritical marks useful with the phonic representations of FIG. 1;

FIG. 3 is a view in perspective of one illustrative embodiment of device of this invention;

FIG. 5 is a sectional view taken along the line 5—5 of FIG. 3;

FIG. 7 is a view in perspective of a selection device used in conjunction with the embodiment of FIGS. 3 and 6.

DESCRIPTION OF THE PREFERRED EMBODIMENT

Figure 4:
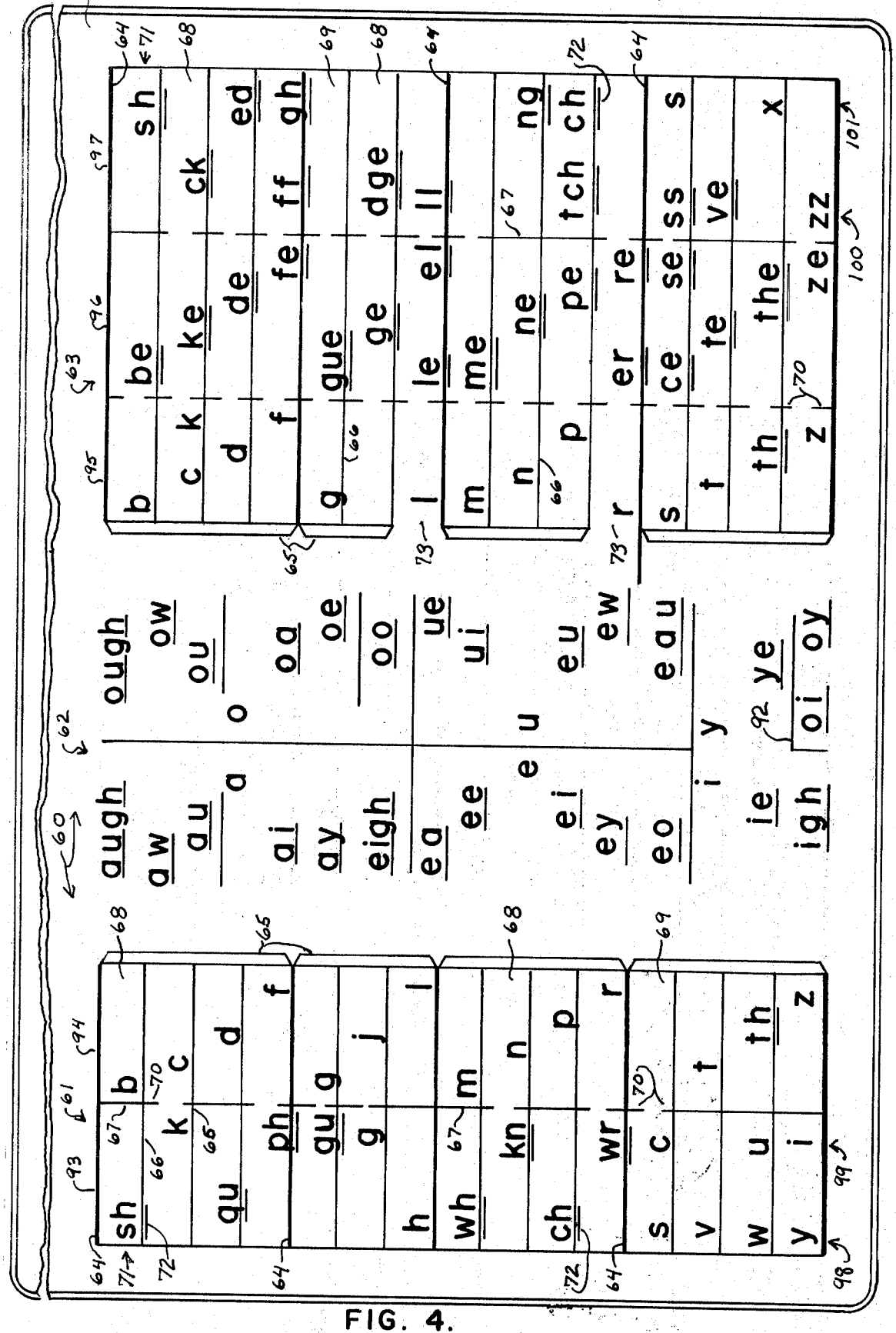
FIG. 4 is a top plan view of the device illustrated in FIG. 3.

Referring now to the drawings, and in particular to FIGS. 3 through 7, reference numeral 51 indicates a preferred embodiment of this invention in the form of a notebook including a closure 80 having a front 52, a back 53, and a binding 54. The general form of the notebook 51 is conventional. That is, the binding 54 may have a ring mechanism 55 for inserting punched loose leaf papers within the notebook 51.

The particular embodiment of the notebook 51 is unusual in that it features a novel construction best illustrated in FIG. 5. As there shown, at least the front 52 of the closure 80 has an inner core 56, a backer board portion 57, a sheet steel or foil portion 58, and an outer cover 59. The back 53 of the closure 80 may be constructed similarly to the front 52, if desired. The preferred embodiment utilizes such similar construction and for this reason, the back 53 is not described in detail.

The inner and outer covers 56 and 59, in the embodiment illustrated, are conventional vinyl fabrics. However, other cover material may be utilized, if desired. Vinyl offers durability and low cost. The backer board 57 also is conventional chip or particle board. Other backer board materials work well. The sheet steel portion 58 preferably is a 0.002 inch thick overlay of steel foil or other magnetic material which is secured within and between the covers 56 and 59 by any convenient method. In the preferred embodiment, the portion 58 is attached to the backer board 57 and this combination is encased within the covers 56 and 59. As previously indicated, at least one of the front 52 or back 53 of the notebook 51 has this laminated construction.

An array 60 is disposed on outer cover 59 of the front 52. The array 60 comprises 43 sounds in a variety of spellings for the English language. These sounds are listed in FIG. 1 beside reference numerals 1 through 43. The array 60 generally includes a first column 61, a second column 62 and a third column 63. The column 62 lists spellings of vowel sounds in the English language. The columns 61 and 63 list spellings of consonant sounds in the English language. It may be observed that the array 60 is disposed so that sounds of the English language are arranged consonant-vowel-consonant corresponding to the sequence of spoken English sounds where no consonant is uttered separately but precedes or follows a vowel.

The column 61 has a plurality of dark, horizontal lines 64 separating the column 61 into a plurality of sections. The column 63 likewise has a plurality of dark horizontal lines, also indicated by the numeral 64, dividing the column 63 into a plurality of sections. The particular sections are indicated by group-lines 65 between pairs of lines 64. A series of lighter horizontal lines 66 and vertical lines 67 divide the various groups into boxes, generally indicated by the numeral 68. The boxes 68 have the consonant sounds shown in FIG. 1, generally corresponding to the numerals 1 through 27, placed in them. A number of boxes, indicated by the numeral 69, are blank and are utilized as indicated hereinafter.

Certain of the lighter vertical lines defining the boxes 68 and 69, are broken lines and these lines are indicated by the numeral 70. Columns 61, 62 and 63 are intended to be read left to right as viewed in FIG. 4. In addition, the columns 61 and 63 generally are used together. For example, it may be observed in a line 71 of columns 61 and 63, that the sound "sh" appears both at the beginning and at the end of the line 71. The "sh" sound appears twice because this sound is present in both beginning and ending positions of many syllables of the English language. It also should be noted that the "b" sound in column 61, line 71 is repeated in column 63, line 71 and that the boxes 68 containing this particular sound are separated by the broken line 70. The broken line 70 is utilized where the sounds either before or after that line are the same. Thus, line 71 has five boxes 68 in the columns 61 and 63. However, the five boxes represent only two sounds. These two sounds are those listed after the numerals 1 and 2 in FIG. 1. The 25 remaining numerals, for a total of 27, which are shown in FIG. 1 opposite those numerals may be obtained from the array 60 by reading successive lines of the array, remembering broken lines 70 separate like sounds. The sound listed after the numeral 27 is a combination of two overmarks which is used to indicate an "sh" sound that is not spelled as an "sh." This sound occurs in words such as "vision," "garage" and "measure." As there is no spelling in the English language which uniquely indicates this sound, no individual place is assigned to it on the array 60. This sound is indicated solely by the overmark symbol of number 27 placed over existing spelling of the words. When present in a word which is to be displayed on the array 60 by the student, the display may be made, for example, simply by having the student indicate the symbol 27 over the appropriate spelling. The vinyl covers 56 and 59 of the notebook 51 are well suited for this use. Thus, some type of water soluble writing instrument can be used to write on the array 60 and later removed with a damp cloth, for example.

As is conventional, the underline indicated by the numeral 72, for example, is utilized where plural letters are spoken as a single sound.

It also may be observed that the letters "l" and "r" in the column 63 have an open space indicated by the numeral 73 between those letters and the column 62. This visual signal is used for a purpose explained hereinafter.

Column 62, as previously indicated, contains vowel spellings of the English language. A grid 74 divides the column 62 so that the vowels a, e, i (y), o and u may be presented visually in separate sections of the grid 74.

As indicated in FIG. 1, the vowel sounds in the English language are 16 in basic number, which number includes the "l" and "r" sound in certain instances. Because the "l" and "r" sounds sometimes assume a vowel sound, they are positioned, in column 63 so as to visually interconnect with column 63 through a pair of openings 73. I have found this to be a great aid in teaching both reading and spelling.

The sound represented by "oi" and "oy" indicated by the numeral 42 in FIG. 1 is separated from the other sections of the grid 74 by a division line 92. In general, various spellings which may represent a vowel sound in a word are placed with that vowel section of the grid 74. An example of this is the presence of "eigh" in the section having spelling sounding like the vowel "a." The sound represented by "oi" or "oy" is somewhat unique in that it does not have its sound shared by any other spelling. It is convenient, for this reason, to visually indicate to the student the sound's uniqueness by the line 92.

Although there are 16 basic vowel sounds in the English language, each sound may have a number of different spellings. In order to denote the sounds of these spellings, it often becomes necessary to utilize a special system of diacritical marks 81, which are shown in FIG. 2.

In gaining an understanding of the array 60, it must be remembered that talking is made up of sounds. A child learning to read and write has to be able to hear each sound of a word. Many of these sounds are not pure sounds so a child has to learn how they have been divided off in the English language. The word "rain" makes a good example. The English language divides that word into three sounds. The middle one, written "ai," is the one we let our breath out on in speaking. I find it convenient to call this sound the breathe-out sound. The sound in front of it, the "r" just stands for a certain way we lift and curl our tongue toward the top of our mouth before we begin breathing out the breathe-out "ai." I find it convenient to call the "r" a front edge for the "ai" breathe-out sound. We stop breathing out the "ai" by lifting the tongue rim all the way to the top of our mouth toward the teeth, sending the last bit of breath briefly out through the nose. The "n" stands for doing all of that, and I find it convenient to call this sound the back edge of the word "rain." In general, a child cannot hear the breathe-out and the edges separately at first because the edges take only an instant to say, but the breathe-out sound can last as long as breath is left. It will be apparent then, that the columns 61, 62 and 63 of the array 60, besides being arranged in a consonant-vowel-consonant grouping, also may be considered as arranged, for a syllable, in front edge, breathe-out, and back edge groupings. The purpose of the diacritical marks of FIG. 2, to be used above letters, is to inform the learner what the sounds of the desired word are and to fix a sound to a given spelling independently of its appearance in a word. The underline, as previously indicated, is used with letters that are taken together to make one sound, while each separate letter is a separate sound. The learner clearly is able to see that "rain" has three sounds, r, ai and n. Likewise, it is immediately evident to him that the word "eight" or "ate" only has two sounds, no matter how it is spelled. The various diacritical marks 81 utilized to show what sound an overmarked letter gives to the breathe-out spelling are, for example: the letter "a" with a mark 85 says the "uh" sound as in "was." The letter "a" with a mark 84 over it says the name of the letter "a" as in "rain." That letter with the mark 83 over it says the "aw" sound as in "want." The letter "o" with a mark 86 over it is the "oo" sound as in "to" and the letter "y" with the mark 86 over it is the letter name of "e" as in "Johnny." Further, it may be seen that the overmarks 85, 88, 89 and 83 say their respective sounds no matter what letter they are over. Thus, the mark 85 is equivalent to the "uh" sound no matter what letter it is over. Likewise, the mark 83 is equivalent to the "aw" sound no matter what letter it is over. It also may be observed that the overmark 88 always indicates the short breathe-out sound heard in "bet." Likewise, the overmark 89 is the short breathe-out sound heard in "bit." I have chosen to call the overmark 84 over a vowel the long sound of the overmarked letter. No mark at all indicates the short sound. The overmark 87 when used with the vowels a, e and i or over any consonant stands for the sound that letter would have if presented alone. Thus, when the overmark 87 is present over a, e or i the sound is still the short sound, as in "plaid," "head" and "sieve"; "ch" is the same as "c" by itself, as in "school." Finally, the overmark 90 over an edge sound voices that sound, as in the word "of" (ov), and beige.

The above illustration of the use of the diacritical marks 81 with certain words of the English language is merely illustrative. It may be observed, however, from the above discussion, that component words of a language may be broken down into component parts according to their sounds. These sounds, for the majority of words in the English language, are arranged into columns as shown in FIG. 4. The boxes 69, which are blank, are provided so that certain rarer spellings may be included as the occasion arises. For example, certain spellings such as the "mb" as in "lamb" are not included in the array 60. The sounds may be written in on the appropriate line for the sound desired or may be otherwise attached to the notebook 51 when the student is using the device of this invention. Likewise letters only may be added to existing spellings to produce spellings not present.

In general, the following internal structure is used to construct the array 60. The vowel sound spellings of column 62 are grouped around the single letter whose long sound is their most frequent sound, or the spelling is grouped around the vowel having the same first letter. The consonant sound spellings of columns 61 and 63 are more or less alphabetical from top to bottom of the array 60. A file 93 of the column 61 includes a sub-file 98 and a sub-file 99 which are read vertically with respect to FIG. 4. The sub-file 98 contains double letter spellings and spellings occurring more frequently before the vowel, rather than after. Sub-file 99 contains less frequent spelling variations of the sounds set out in the sub-file 98 and the file 94. A file 94 of column 61 and a file 95 of column 63 include mostly single letter spellings that follow short sounding vowel sounds or vowel sounds containing more than one letter. A file 96 of column 63 includes a sub-file 100 and a sub-file 101 which also are read vertically with respect to FIG. 4. The sub-file 100 contains spellings following a single-letter, short sounding vowel. The sub-file 101 contains double letter spellings of consonant sounds present in sub-file 98 and spellings characteristically occurring more frequently after the vowel, rather than before. It also may be observed that all spellings of a particular consonant sound are listed on the same level of the array 60 as read left to right in FIG. 4. It will be understood by those skilled in the art that while the above structure is preferred in the construction of the array 60, it cannot be followed strictly in all instances.

Referring now to FIG. 7, a marking means 50, useful with the notebook 51, is illustrated. The marking means 50 is an annulus having an opening 49 through it. The marking means 50 is constructed from magnetic material and is intended to adhere to the front 52 of the notebook 51. A variety of commercially available materials may be utilized in the construction of the marking means 50. The individual marking means 50 may be colored differently. Although an annulus is utilized for the marking means 50, other shapes are compatible with the broader aspects of this invention, provided they enable the user to place the marking means 50 over a particular sound in the array 60 and read that sound through the marking means. Use of the marking means 50 with the notebook 51 is easy for young students to master and understand. Simply by putting down the marking means 50, and by lifting it up, the student is composing and erasing respectively. In the word "rain," the child, because of the system previously described, will hear three sounds. Marking means 50 will be placed over the "r" of the column 61, the "ai" sound of the column 62, and the "n" of column 63. The child then can assign the spoken sounds he hears to the spellings he sees. In recollecting the original spoken sound while seeing the written, the child is in fact reading the word "rain." Reading consequently becomes hearing (with understanding) the sequence of sounds one sees. This is a much clearer concept for a child to understand than the concept that words are meanings one sees or that words are an assemblage of separately learned sounds as conventionally taught in prior art phonic systems.

Figure 6:
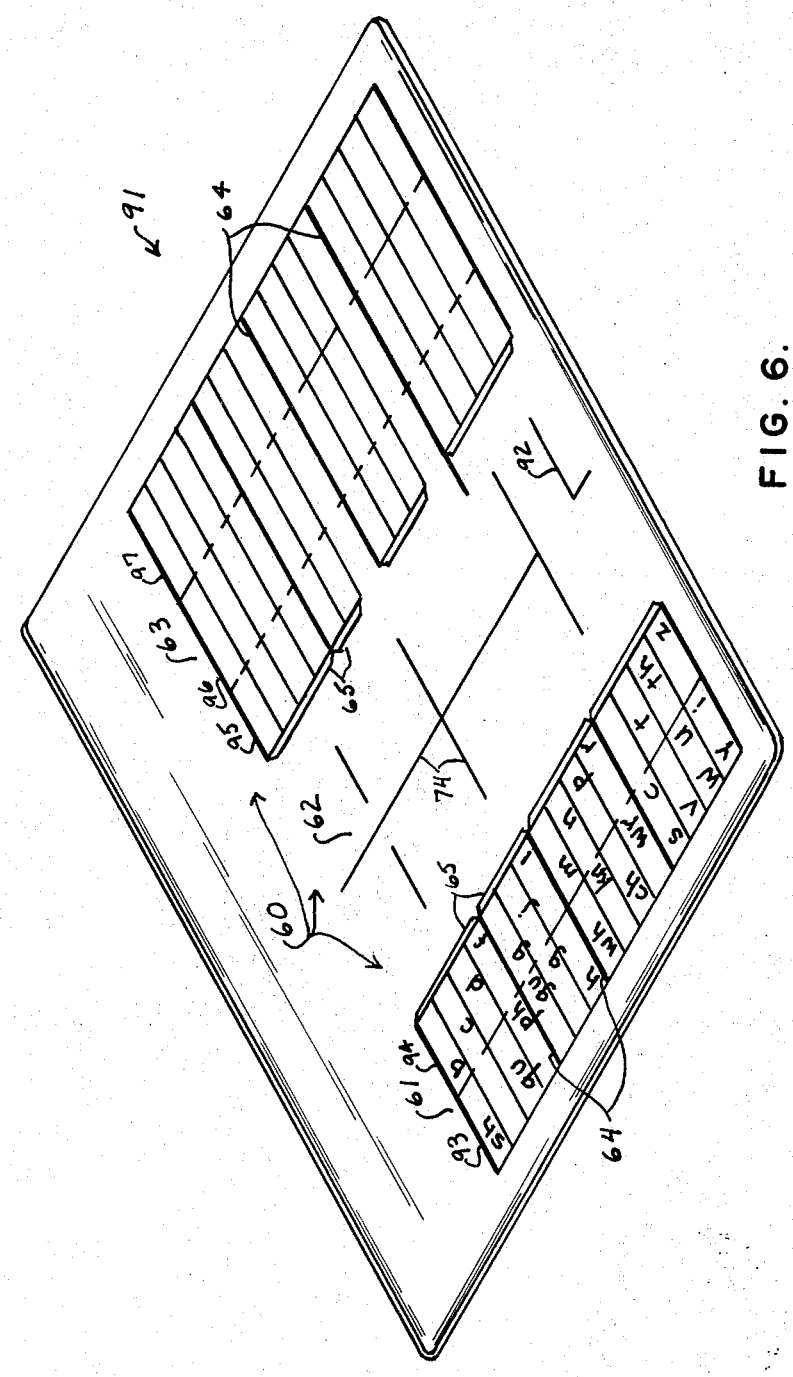
FIG. 6 is a view in perspective of a second illustrative embodiment of device of this invention.

FIG. 6 is a view of a second illustrative embodiment of apparatus of this invention. As there shown, a lap board 91 is provided which closely resembles the front 52 of the notebook 51. Its construction is similar, but its use is as a hand held device which the child may hold or place in his lap and use as described previously. Marking means 50 works well with board 91.

Numerous variations, within the scope of the appended claims, will be apparent to those skilled in the art in light of the foregoing disclosure and accompanying drawings. Thus, the particular sounds of the array 60 may be positioned differently. In the embodiment illustrated, the first two boxes of the column 61 contain the usual beginning spellings, including double letter beginnings of words, while the second box in the column 61 contains mostly single letter spellings. Top to bottom order in the columns 61 and 63 is more or less alphabetical. While this is a preferred arrangement, other arrangements are compatible with the broader aspects of this invention. Likewise, the marking means 50 may assume a variety of configurations. While marking means 50 was described as an annulus, other shapes work well. While the marking means 50 was described as constructed of a magnetized material, the steel layer 58 may be magnetized and the marking means 50 may be constructed of magnetic material. Even a conventional pen or pencil may be used as the marking means, particular sounds being circled for presentation. It also will occur to those skilled in the art that the device of this invention may be used in conjunction with a variety of word games or exercises. The array 60 automatically will indicate spellings and the left to right order of sounds within a syllable. When a very long word is displayed on the array 60, however, the left to right order of the various syllables is not evident. This order can be indicated by drawing lines between the sounds in any one syllable, for example. Likewise, the array 60 can be used to indicate all the sounds of the words in a sentence. Then a series of squares or other indicating grouping may be provided corresponding to the number of sounds in each word. Certain of the squares may have markings on them to indicate which of the sounds are vowel sounds and which of the sounds are consonant sounds. The vowel sounds themselves may be given. In any event, the student or player chooses the sounds given on the array 60 to complete the remaining squares, which in turn solves the sentence. The squares or other indicating system may be considered a sound map of a word series or sentence. While they may, in some instances, resemble a conventional crossword puzzle, each square represents a sound in a word rather than an individual letter of the word. It will be recognized that a number of word games or exercises, appealing to both adults and children, can be derived using the array 60 and sound maps of words or sentences. These variations are merely illustrative.

Having thus described the invention, what is claimed and desired to be secured by letters Patent is:

1. A teaching device comprising:
   means for displaying a plurality of phonic representations, said display means including a first part having a layer of magnetic material and a cover overlay covering said magnetic material, said overlay having an array disposed on it, said array dividing said cover into a plurality of areas, said plurality of areas including a first column of areas, a second column of areas and a third column of areas, each of said first and said third columns including a plurality of subfiles, the areas of said first, said second and said third columns of areas having a plurality of indicia disposed on them, the indicia of said first and said third columns of areas comprising letter representations of consonant sounds, the indicia of said second column comprising letter representations of vowel sounds; and
   means for selecting a sequence of said indicia from said array, said selecting means being removably engagable with said display means, individual ones of said indicia being observable through said selecting means.

2. A teaching device comprising:
   means for displaying a plurality of phonic representations, said display means having a first part including a first layer and a second layer comprising means for permitting removal of selecting means, said first layer having an array disposed on it, said array dividing said first layer into a plurality of areas, said plurality of areas including a first column of areas, a second column of areas and a third column of areas, each of said first and said third columns including a plurality of subfiles, the areas of said first, said second and said third columns of areas having a plurality of indicia disposed on them, the indicia of said first and said third columns of areas comprising letter representations of consonant sounds, the indicia of said second column comprising letter representations of vowel sounds; and means for selecting at least one of said indicia from said array, said selecting means comprising at least one annulus having an opening therethrough for permitting visual observation of the selected indicia, and attachment means associated with the annulus for permitting removable engagement of said selecting means with said display means.

3. A reading and spelling teaching device comprising:

means for displaying a plurality of phonic representations, said display means comprising a notebook having a front cover portion, a back cover portion and a binding between said front and said back cover portions, at least one of said front and said back cover portions comprising a plurality of layers including a substantially flat layer of magnetic material coextensive with one of said front cover portion and said back cover portion, and a cover layer;

an array of phonic representations disposed on said cover layer of said display means, said array comprising a columnar arrangement of vowel sounds, a first column of consonant sounds, and a second column of consonant sounds, said first and said second columns of consonant sounds being positioned on opposite sides of said columnar vowel arrangement, said vowel sound arrangement being divided into groupings about an individual vowel, said groupings comprising a plurality of spellings of each individual vowel sound, each of said first and said second columns of consonant sounds being arranged in a plurality of subfiles containing spellings of said consonant sounds, said subfiles including means for visually indicating similar sounds of said consonant spellings, said last mentioned means including a plurality of boxes comprising horizontal and vertical lines, said vertical lines being broken between similar sounding consonant spellings; and movable means for selecting and simultaneously presenting to view a sequence of said phonic representations from said display of all phonic representations, said sequence corresponding to at least the sounds in a syllable.

4. The device of claim 3 wherein said selecting means comprises at least one annulus having an opening therethrough, said opening being sized to permit visual observation of at least one of said phonic representations through it, said annulus being constructed from magnetic material, one of said annulus and said layer of magnetic material of said notebook being magnetized.

5. A reading and spelling teaching aid comprising:

a notebook, said notebook including a back portion, a front portion and a binding portion connecting said front and said back portions, at least one of said front and said back portions being of laminated construction including a layer of substantially flat magnetic material approximately coextensive with the length and width dimensions of said cover portion, and a cover layer, said cover layer having an array of phonic representations disposed on it, said array comprising a columnar arrangement of vowel sounds, a first column of consonant sounds, and a second column of consonant sounds being positioned on opposite sides of said columnar vowel arrangement, said columnar vowel sound arrangement being divided into groupings about an individual vowel, said groupings comprising a plurality of spellings for each individual vowel sound, each of said first and said second columns of consonant sounds being arranged in a plurality of sub-files containing spellings of said consonant sounds, said sub-files including means for visually indicating similar sounds of said consonant spellings; and means for selecting and simultaneously presenting to view a sequence of said phonic representations from said display of all phonic representations, said sequence corresponding to at least the sound of a syllable.

6. The device of claim 5 wherein the sub-file of consonant sounds on one of said opposite sides of said columnar vowel arrangement includes the letters L and R, said device including means for visually indicating that the letters L and R in use may have a vowel sound.

7. A teaching device comprising:

means for displaying all of a plurality of phonic representations, said display means including a first part having a laminated construction including a layer of magnetic material and a cover overlay covering said magnetic material, said overlay having an array disposed on it, said array dividing said cover into a plurality of areas, said plurality of areas including a first column of areas, a second column of areas and a third column of areas, each of said first and said third columns of areas including a plurality of sub-files, and a plurality of indicia disposed in said first, said second and said third columns of areas, the indicia of said second column comprising letter representations for vowel sounds, the indicia of said first and said third columns comprising letter representations of consonant sounds; and means for selecting a sequence of said indicia from said first, said second and said third columns of areas for simultaneously defining the spelling and the pronounciation of at least a syllable of the language, said selecting means being removably engagable with said display means.

8. The device of claim 7 wherein said sequence of indicia is observable through said selecting means.

* * * * *